July 22, 1969 E. D. ERMENC ET AL 3,456,931
ASBESTOS MILLBOARD CONVEYOR ROLLS FOR HIGH TEMPERATURE USE
Filed Feb. 9, 1967
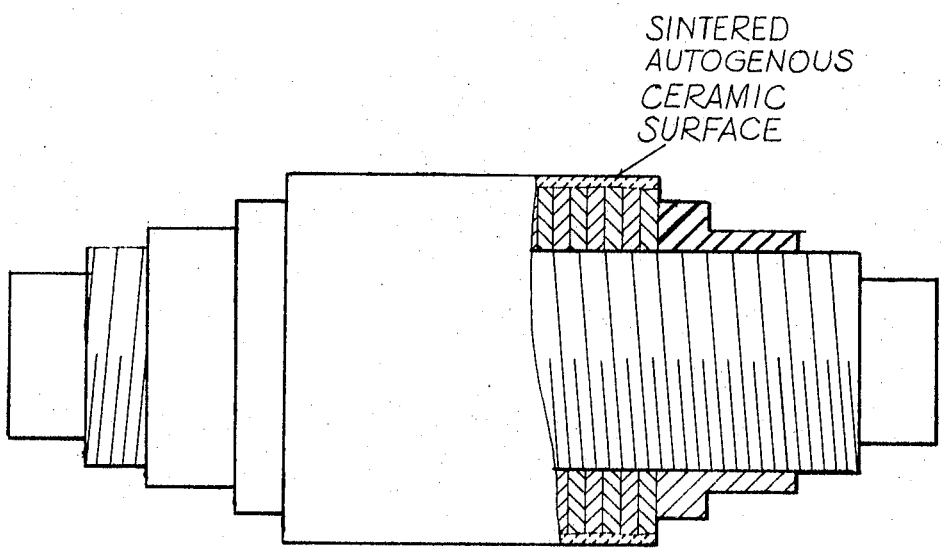
INVENTOR/S
EUGENE D. ERMENC
& MARION F. SMITH
BY *Melville, Strasser, Foster and Hoffman*
ATTORNEYS United States Patent Office 3,456,931
Patented July 22, 1969

3,456,931
ASBESTOS MILLBOARD CONVEYOR ROLLS FOR
HIGH TEMPERATURE USE
Eugene D. Ermenc and Marion F. Smith, Cincinnati,
Ohio, assignors, by mesne assignments, to Philip Carey
Corporation, a corporation of Ohio
Filed Feb. 9, 1967, Ser. No. 614,799
Int. Cl. F27b 9/30; F27d 3/00; B21b 27/00
U.S. Cl. 263—6                                    8 Claims

ABSTRACT OF THE DISCLOSURE

A conveyor roll for use in steel furnaces and elsewhere, capable of withstanding continuous use at temperatures up to 2000° F. and above without crumbling or breakage. The roll is composed of a plurality of annular discs of asbestos millboard compressed axially on a shaft. The cylindrical roll so constituted is subjected to surface heating at such a temperature and for such length of time to cause the oxides of the asbestos component and the binder component of the millboard to be dehydrated and to fuse into a continuous shell of a ceramic nature.

Cross reference to related application

An asbestos millboard of a particular composition and having certain desirable properties for use in conveyor rolls is disclosed in copending application of William A. Moore, Ser. No. 395,816, filed Sept. 11, 1964, now U.S. Patent No. 3,334,010 and entitled "Heat-Resistant Fibrous Amphibole Asbestos Board Containing an Inorganic Binder." The board of said copending application can endure surface temperatures up to 1500° F.

Background of the invention

The invention is in the field of asbestos millboard and particularly the use of asbestos millboard in the production of conveyor rolls for use at temperatures of 2000° F. and above.

Asbestos millboard has been produced commercially for many years. It is composed chiefly of asbestos fiber with a minor proportion of binder to bond the fibers together and to impart strength and other desirable properties to the board. Asbestos millboard is distinguished from so-called "asbestos cement" boards in that in asbestos millboard the asbestos fiber is the major component whereas in asbestos cement boards the portland cement is predominant. The asbestos component may be chrysotile or an amphibole asbestos such as blue crocidolite. The binder component is most commonly portland cement. The method by which asbestos millboard is produced is described in some detail in the copending application above referred to and will not be discussed further herein since it is not a feature of the present invention. It is well understood in the art that particular qualities in the millboard as to density, hardness, resistance to compression, flexural strength, mechanical stability, resistance to shrinkage under heat exposure, and the like, will vary in accordance with the particular composition and procedures in manufacturing.

The asbestos millboard rolls of the above mentioned copending application are capable of withstanding surface temperatures in the area of 1500° F. and for many applications this is entirely adequate. When, however, it is sought to use such rolls at higher temperatures on the order of say 2000° F., the asbestos millboard dehydrates, losing its water of crystallization out of the asbestos fiber and the chemically combined water set out of the hydrated portland cement. This loss of water or dehydration makes the millboard shrink very substantially and causes it to become brittle. Generally, conveyor rolls are made up by threading a plurality of annular discs onto a shaft and holding them on the shaft under axial compression. At the temperatures herein discussed, cracks open up between the millboard discs and some of the discs will crack and chip and pieces of a disc will fall out. It has, thus, been impossible heretofore to use asbestos millboard conveyor rolls in steel annealing furnaces in place of the high alloy steel rolls which are now used.

Generally present day conveyor rolls used in the steel industry in annealing furnaces and the like are hollow and made of high alloy steel. Some rolls are cylindrical, others are cylindrical with circumferential steel bands about one inch wide and a half inch deep welded on at 18 to 24 inch spacing along the rolls. These bands, which are known in the industry as tires, carry the steel plates or sheets through the furnace. The so-called tires are narrow in order to present only a small surface for the accumulation of scale and slag. The rolls are cleaned up as often as weekly and the small width tires when used, or the plain cylindrical rolls, are ground to remove embedded scale. Such steel rolls are cooled by running water through them in large quantity and of course the water emerging from the roll is steaming hot. This cooling of the rolls, of course, removes a substantial amount of heat from the furnace. Furthermore, if the steel rolls are stopped while in the furnace, they sag slightly and when the mechanism is restarted the rolls "hump" the plate along, produce repeated roll flexure, and eventual breakage. A high alloy steel roll as above described generally has a life of less than six to twelve months at a temperature of 2000° F.

Rolls according to the present invention can be used to replace the high alloy steel rolls and will eliminate most of the disadvantages described above, and also provide special advantages inherent in their non-metallic structure.

Summary of the invention

According to the present invention, a conveyor roll is made up by sliding a plurality of asbestos millboard annular discs onto a shaft, compressing them axially on the shaft as has been done in the past, and then subjecting the cylindrical surface of the roll so formed to such a temperature and for such a length of time as to drive off the water of hydration of the asbestos and portland cement components of the millboard and to produce on the cylindrical surface an autogenous ceramic case of controlled thickness by the fusion of the oxide components of the millboard.

Description of the preferred embodiment

In the preferred embodiment of the invention, the millboard will be composed of a major proportion of chrysotile asbestos rather than say crocidolite, simply because it is more readily available in this country and functions equally well. The annular discs will be made up in the usual manner which will not be described herein because it does not constitute a part of the invention.

When a supply of discs has been provided they are threaded onto a shaft and placed under compression in the usual manner. It may be noted at this point that, as will be pointed out hereinafter, the core of the final roll will remain cool. A standard inexpensive steel can be used for the hollow shaft rather than the very expensive high alloy stainless steel which is now used and a further saving is thus achieved.

It is now necessary to heat the surface of the cylindrical roll to a high temperature in order to fuse the oxides in the asbestos and binder components into a ceramic shell. This may be accomplished by heating with an acetylene torch by heating in a tubular furnace or in any other convenient way. The fusion point of various asbestos fibers will range from about 2300° F. to around 3000° F. For example, in the publication "Inorganic Fibers" by C. Z. Carroll-Porczynski (1958), the fusion point of chrysotile asbestos is stated on page 175 to be 2770° F. The specific temperature to which the surface of the roll is heated will of course depend upon the particular composition of the asbestos millboard. The fusion or sintering temperature of the millboard will depend upon the kind of asbestos, amount of impurities present, kind and amount of binder use, etc.

Heating the surface of the roll to the temperatures mentioned above of course produces shrinkage of the discs. A plurality of discs may be placed upon the shaft under compression and the roll may then be heated to about 2000° F. to produce shrinkage of the discs, the space created by shrinkage may then be made up with additional shrunk discs to produce a roll of the desired length and then the entire roll may be subjected to a temperature from 2300° F. to 3000° F. to produce surface sintering so as to form a continuous autogenous ceramic shell or casing of controlled depth. For convenience, reference may be made to the figure which shows a partially sectioned conveyor roll constructed in accordance with the teachings herein.

Composition and structure of the roll surface

The structure of the ceramic shell which is produced as the surface layer of the asbestos millboard roll of this invention may properly be described as autogenous, because it is formed entirely from the material components of the asbestos millboard by a ceramic process, namely sintering or fusion of the mineral oxides. When the millboard is produced from chrysotile asbestos with a minor proportion of portland cement as the binder for the asbestos fiber, the autogenous ceramic shell is predominantly of magnesium silicate. Small amounts of calcium, aluminum and iron silicates, from the portland cement, will also be present in the sintered ceramic shell. If asbestos of different chemical composition, such as crocidolite, is used to make the millboard, the composition of the sintered autogenous ceramic shell will be determined by the mineral oxide composition of the particular kind of asbestos used. In any event, the autogenous sintered shell of the roll is a true ceramic casing for the asbestos millboard roll and enables it to endure continuous service as a conveyor roll at temperatures of 2000° F., without cracking, shrinkage, crumbling, or appreciable deterioration of its structural integrity, for long periods of time.

It is also possible to sinter the surface of the disc first and then shrink the discs thereafter, adding additional discs to make up for shrinkage, surface sintering the new discs and reheating to shrink the new discs until a complete roll of the required length is produced.

The depth of the ceramic shell on the finished roll will of course depend upon the length of time the roll surface is subjected to sintering temperature. As presently understood, a sintered shell need not have a thickness greater than about 1/64 inch. Preferably, a minimum thickness of the sintered shell would be about 1/32 inch. Greater thicknesses than 1/8 inch can readily be made; but this is a function of time and temperature, and therefore increases the cost.

A depth of sintering of about 1/64 inch is achieved in from about four minutes to about 1/2 minute within the temperature range of 2500° F. to 3000° F.

The sintered autogenous ceramic shell produced on the millboard roll by the surface heating of the asbestos millboard tends to be somewhat rough and uneven, especially when the sintering has been done by application of a torch flame such as from an acetylene torch. However, when the roll is in use as a conveyor roll for stainless steel sheets the surface of the roll soon wears smooth. If desired, the sintered ceramic shell can be rendered smooth before the roll is placed in service by turning or grinding the surface but if this is done the depth of autogenous ceramic shell remaining must be at least the minimum above specified.

It has been found possible to estimate the temperature gradient within a roll produced as above described in that crocidolite fiber owes its blue color to ferrous iron in the crocidolite molecule. As the fiber is exposed to various temperatures, the ferrous iron is oxidized with a range of colors from blue at 600° F. up to brownish yellow at 2000° F. A roll according to the present invention after being subjected to 2000° F. heat was cut transversely and the outside was brownish yellow indicating that it had been heated to 2000° F., but the inner inch of the disc was blue indicating that its temperature did not exceed 600° F. Because of this tremendous temperature gradient, the shaft of the roll may be made of a standard inexpensive steel and the water flow through the shaft can be very greatly reduced or even eliminated, so that heat loss from the furnace is minimized.

The use of rolls as herein described results in a steel sheet, stainless or carbon, which is kept flat and requires little or no additional straightening after the annealing. In the past when the steel plates were supported on the narrow tires of the high alloy metal rolls, the plate sagged between supports and became distorted or "corrugated." A flattening treatment was always required to flatten out the plates after annealing.

Whereas the high alloy rolls of the prior art had an average life of less than six to twelve months at temperatures of 2000° F., rolls according to the present invention will last at least twelve months. It is not possible to state at present how much longer they will last because rolls which have been in use twelve months are still functioning satisfactorily and have not sagged nor broken.

To summarize the advantages of the asbestos millboard rolls of this invention, they provide thermal insulation for the supporting shaft on which the millboard discs are mounted, thus reducing the temperature to which the shaft is exposed in the annealing furnace. The shaft may be made from ordinary steel instead of the more costly high alloy steel. The useful service life of the shaft, protected by the asbestos millboard discs, is greatly increased. Thus, the amount of cooling water required is greatly reduced and this reduces the heat loss from the furnace, resulting in lower fuel cost.

Additionally, a roll according to the present invention, having the autogenous ceramic shell, has a hard surface and is semi-rigid, but is not as hard and rigid as the high alloy steel rolls heretofore used. It has adequate strength and hardness to convey the steel sheets which pass thereover, but is not hard enough to mar their surface. The asbestos millboard roll actually cushions the steel sheets and minimizes any tendency to distortion or the production of surface blemishes.

Further, the asbestos millboard roll of this invention is formed as a full cylinder so that the entire surface provides support for the steel sheets conveyed thereover. There are no elevated "tires," as with high alloy steel rolls, between which the steel sheets can sag because they are unsupported, resulting in deformation.

Finally, the roll of this invention has a sintered, fully-oxidized ceramic shell as its surface and has no tendency to oxidize and form scale as steel rolls do in high temperature service. This eliminates the necessity for shutting down the annealing furnace at frequent intervals to remove scale and re-grind the rolls or the tires of the high alloy steel rolls. This results in great cost savings in respect to maintenance labor and lost production time, in the manufacture of steel sheets.

It will be understood that the invention is applicable to rolls made from asbestos millboard of various compositions and that it will only be necessary to modify the sintering temperatures and times for particular millboard compositions in order to achieve the desired shrinkage and sintering depth as above outlined.

It is also understood that rolls treated as disclosed herein may be used at lower temperatures with metals other than steel and stainless steels, such as copper, aluminum, etc., and with non-metals, such as glass.

The embodiments of the invention in which an exclusive property or privilege is claimed are defined as follows:

1. A conveyor roll for use at high temperatures in the region of 2000° F. and above, said roll consisting of a shaft having a plurality of closely abutted discs of asbestos millboard mounted thereon, providing a cylindrical roll, the surface of said roll being continuous, and composed of a sintered autogenous ceramic material, such as is produced by heating at a temperature of at least 2300° F.

2. A conveyor roll according to claim 1, wherein the asbestos fiber component of said millboard is chrysotile asbestos.

3. A conveyor roll according to claim 1, wherein the asbestos fiber component of said millboard is crocidolite blue asbestos.

4. A conveyor roll according to claim 1, wherein said ceramic surface has a thickness of about 1/64 inch or more.

5. The method of producing a conveyor roll capable of use at temperatures in the region of 2000° F. or above, which comprises providing a plurality of annular discs of asbestos millboard, sliding said discs onto a shaft, compressing them axially on said shaft to provide a cylindrical asbestos millboard roll, and subjecting the cylindrical surface of said roll to such a temperature for such a length of time as to drive off the water of hydration of the asbestos component and the binder component of said millboard and to fuse the oxides thereof to a ceramic condition to a depth of about 1/64 inch or more.

6. The method of claim 5, wherein said roll is subjected to a temperature of about 2000° F. to drive off the water of hydration and to produce shrinkage of the discs, additional shrunk discs are then slid onto the shaft and axially compressed until a roll of the desired length is achieved and the entire roll is thereafter subjected to a sintering temperature of at least 2300° F.

7. The method of claim 5, wherein the roll is first subjected to sintering temperature and then reheated to a temperature of about 2000° F. to produce shrinkage of the discs, additional discs are then slid onto the shaft and surface sintered and then reheated to a temperature of 2000° F. while under axial compression to shrink them so as to produce a completed roll ready for use.

8. The method of claim 5, wherein the sintering temperature is from about 2500° F. to about 3000° F.

References Cited

UNITED STATES PATENTS 3,116,053 12/1963 Ericsson.
3,317,303 5/1967 Shorr _____ 29—132 X JOHN J. CAMBY, Primary Examiner.

U.S. Cl. X.R.

29—132.